---

United States Patent [19]

Godfrey

[11] 4,207,220

[45] Jun. 10, 1980

[54] HEAT CURABLE HOT-MELT ADHESIVES CONTAINING MODIFIED POLYETHYLENE

[75] Inventor: Darryl A. Godfrey, Longview, Tex.

[73] Assignee: Eastman Kodak Company, Rochester, N.Y.

[21] Appl. No.: 939,093

[22] Filed: Sep. 1, 1978

[51] Int. Cl.² .................... C08L 93/04; B32B 27/32
[52] U.S. Cl. ............................. 260/27 R; 428/440; 428/456
[58] Field of Search .............. 260/27 R; 428/440, 456

[56] References Cited

U.S. PATENT DOCUMENTS

| | | | |
|---|---|---|---|
| 3,607,808 | 9/1971 | Thompson et al. ............... | 260/27 R |
| 3,615,106 | 10/1971 | Flanagan et al. ................... | 260/27 R |
| 4,022,728 | 5/1977 | Trotter et al. ...................... | 260/27 R |
| 4,043,959 | 8/1977 | Frye ................................... | 260/27 R |
| 4,072,735 | 2/1978 | Ardemagni ........................ | 260/27 R |
| 4,076,670 | 2/1978 | Godfrey ............................. | 260/27 R |
| 4,140,733 | 2/1979 | Meyer et al. ...................... | 260/27 R |

*Primary Examiner*—H. S. Cockeram
*Attorney, Agent, or Firm*—Clyde L. Tootle; Daniel B. Reece, III

[57] ABSTRACT

The hot-melt adhesives of the present invention comprise a blend of at least one modified polyethylene resin, and at least one rosin ester. This hot-melt adhesive has a novel combination of properties and crosslinks to provide improved bond strength.

30 Claims, No Drawings

HEAT CURABLE HOT-MELT ADHESIVES CONTAINING MODIFIED POLYETHYLENE

This invention relates to curable hot-melt adhesives containing modified polyethylene. One aspect of this invention concerns a hot-melt adhesive containing modified polyethylene having a novel combination of properties. Another aspect of this invention concerns polyolefin-based hot-melt adhesives which crosslink to form adhesive bonds with increased bond strength.

The concept of thermosetting or crosslinking resin adhesives is old in the art. Many resin adhesives are known which undergo an irreversible chemical and physical change to become substantially infusible and insoluble. Thermosetting adhesives comprising both condensation polymers and addition polymers are also known in the art. Examples include the urea-formaldehyde, phenol-formaldehyde, and melamine-formaldehyde adhesives; epoxy, unsaturated polyester, and polyisocyanate (polyurethane) adhesives. However, in virtually all of these prior art adhesives, the chemical crosslinking reaction is essential to bond formation, and in most cases this curing reaction must be accelerated by means of heat to produce a satisfactory bond within a reasonable length of time. In many cases, such as the epoxy adhesives, two or more components must be blended together just prior to the preparation of the bond. Once the components of an epoxy adhesive have been mixed, the adhesive must be used quickly, since the crosslinking reaction begins immediately and is irreversible. Such thermosetting resin adhesives are discussed in detail by C. A. A. Rayner in Chapter 4 of Houwink and Salomon, Editors, Adhesion and Adhesives, Vol. 1, Elsevier Publishing Company, New York, 1965.

Thermoplastic adhesives, which are used in the form of solutions, dispersions, or solids, usually set by purely physical means. One of the most important means of applying thermoplastic adhesives is the hot-melt method. When thermoplastic adhesives are applied as hot melts, bond formation occurs when the polymer melt solidifies. It is well known that this method of application is the most rapid means available for bonding adherends together and gives bonds having greater strength than those obtained from solution-type adhesives. The thermal stability of a thermoplastic resin determines its potential usefulness as a hot-melt adhesive. However, in order for a thermoplastic to be used as a hot melt, it must also have a low melt viscosity to permit application of the adhesive to the adherends at acceptable rates. This usually means the polymer must have a low molecular weight. Consequently, many thermoplastic materials cannot be used as hot melts because they do not have sufficient cohesive strength at the low molecular weights required for application to a substrate. The low molecular weight polyolefins, especially low molecular weight, low density polyethylene, are widely used in hot-melt adhesives for sealing corrugated cartons, closing clay-filled cartons, multiwall bag seaming, carpet seaming tapes, and the like. Since these adhesives are based on low molecular weight polymers, they do not have sufficient strength to be used in structural applications, such as plywood manufacture, or sufficient heat resistance to be used for bonding components which are frequently exposed to elevated temperatures, such as under-the-hood automotive applications. Attempts to improve the bonding strength of these low molecular weight polymers, such as polyethylene by crosslinking with traditional crosslinking agents, such as peroxides or other free-radical initiators, has not been used successfully as a curable hot-melt adhesive. One reason for this is that at the temperature normally required to apply polyethylene as a hot-melt adhesive, the free-radical initiated crosslinking reaction usually leads to a rapid increase in polymer melt viscosity and often causes the polymer to completely "set up". Therefore, such modified low molecular weight materials cannot be dispensed using the hot-melt adhesive applicator systems now available to the industry. It would therefore be an advance in the state of the art to provide polyethylene based hot-melt adhesives having good bonding strength and which can be applied as hot melts.

It is therefore, an object of the present invention to provide a novel hot-melt adhesive.

A further object of the present invention is to provide a modified polyethylene containing hot-melt adhesive which has good physical properties and good bond aging.

Another and further object of this invention is to provide a hot-melt adhesive having good adhesion properties which can be applied without the use of a solvent.

In accordance with the present invention we have found that a blend comprising at least one modified polyethylene resin and a rosin ester provides a hot-melt adhesive which can be applied without solvents and has a novel combination of properties and crosslinks to improve bond strength.

The modified polyethylene has an acid number of greater than 5, preferably about 10 to about 40, and is prepared by reacting polyethylene with an unsaturated polycarboxylic acid or anhydride by processes also well known in the art, as for example, U.S. Pat. No. 3,856,889. The polyethylene reacted with this unsaturated component can be low molecular weight or degraded polyethylene. The modified polyethylene can be used alone as the polyethylene component or blends of such modified polyethylene diluted with unmodified polyethylene or blends of modified polyethylene diluted with blends of more than one unmodified polyethylene can also be used.

Suitable rosin esters useful in the present invention are for example the ethylene glycol, polyethylene glycol, glycerol and pentaerythritol rosin esters, hydrogenated rosin esters or methylated rosin esters. Such rosin esters commercially available are for example "Staybelite" Ester 10 triethylene glycol ester of hydrogenated rosin, "Foral" 85 and 105 highly stabilized ester resins of pentaerythritol and rosin base, "Hercolyn" D hydrogenated methyl ester of rosin purified by steam distillation and "Pentalyn" H pentaerythritol ester of hydrogenated rosin. These rosin esters can be used alone as the rosin ester or blends of such rosin esters as the rosin ester components or blends of such rosin esters diluted with suitable resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinolene, limonene, terpentine, a terpene cut or fraction, and various other terpenes. Particularly useful starting materials are terpene mixtures containing at least 20% $\beta$-pinene and/or limonene or dipentene (racemic limonene), and the "sulfate turpentine" obtained as a by-product in the sulfate pulping process.

The amount of crosslinking obtained with the adhesives of the present invention can be controlled by the amount of modified polyethylene and rosin ester in the adhesive composition. For example, if an adhesive is desired which has moderate improvement in cohesive bond strength, the modified polyethylene can be diluted with unmodified polyethylene and the rosin ester can be diluted with one or more suitable-resinous materials to provide an adhesive containing about 10 percent by weight rosin ester and about 10 percent by weight modified polyethylene with the remainder of the adhesive being diluents for these two components. Likewise if a very viscous highly crosslinked adhesive is desired the formulation can contain about 50 percent by weight rosin ester and about 50 percent by weight modified polyethylene without any diluents. Such adhesive compositions crosslink and become viscous so rapidly however that it would be preferred to use such an adhesive as a two component adhesive with mixing and application being carried out simultaneously. After application the bonded article can be maintained at the applied elevated temperature for a sufficient period to obtain the degree of crosslinking desired. Such an adhesive if mixed and then applied becomes highly viscous during mixing and when subsequently applied has good cohesive properties but poor wetting and flow properties. Therefore, the properties of an adhesive can be customized by the amount of rosin ester and modified polyethylene present in the adhesive formulation. The rosin esters can therefore be used in amounts of about 10 percent to about 50 percent by weight of the adhesive composition, preferably about 20 to 40 percent by weight, most preferably 30 percent by weight. The modified polyethylene or a blend of such modified polyethylenes can be used in amounts of 90 to 50 percent by weight in the adhesive formulation, preferably 80 to 60 percent by weight, most preferably 70 percent by weight. These adhesive compositions provide bonds having a particular combination of desirable properties including good bond strength, good elevated temperature resistance and good aging properties. If the amounts of the components are modified from the above ranges, the desirable combination of properties of the adhesive are affected. For example, if the modified polyethylene is used in an amount greater than 90 percent, the additional amount of crosslinking which takes place does not appreciably increase the cohesive properties. Likewise, if less than 5 percent is used the cohesive properties are not appreciably increased.

The adhesive compositions of this invention are prepared by blending together the adhesive components under an inert atmosphere in the melt at a temperature as low as possible, about 145° C. to about 160° C., until a homogeneous mixture is obtained. It should be noted that the rosin ester and modified polyethylene react to crosslink with an increase of viscosity at the mixing temperature. Therefore, the temperature at which the components are mixed and the period of mixing should be kept as low and short as possible if a low viscosity adhesive is desired. Solvents such as hexane, heptane, mineral spirits, xylene, toluene, benzene, chlorinated hydrocarbons, etc., are not needed to prepare the compositions of this invention; however, they can be used if desired.

In addition to the adhesive components, it is desirable for the adhesive compositions to contain about 0.1 percent to about 1.5 percent by weight, preferably about 0.25 percent to 1.0 percent by weight, of one or more antioxidants. Antioxidants that are effective include, for example, tris(di-t-butyl-p-hydroxybenzyl)-trimethylbenzene (Ionox 330), alkylated bisphenol (Naugawhite), zinc dibutyl dithiocarbamate (Butyl Zimate), and 4,4'-methylene bis(2,6-di-tert-butylphenol) (Ethyl 702), tetrakis[methylene-3-(3',5'-di-t-butyl-4-hydroxyphenyl)-propionate]methane (Irganox 1010), lauryl stearyl thiodipropionate (Cyanox 1212), and dilauryl 3,3'-thiodipropionate (Cyanox DLTDP sold by American Cyanamid) and 2,6-di-tert-butyl-p-cresol (BHT) and the like.

Additives such as nucleating agents, pigments, colorants, UV inhibitors, solvents, and the like can also be added to the adhesive compositions of the present invention.

The various physical properties of my novel product were determined as follows:
 (1) Melt Index—ASTM D1238-57T
 (2) Density—ASTM D1505-57T
 (3) Softening point (ring and ball)—ASTM D36-26
 (4) Melt Viscosity—Brookfield viscosity
 (5) The acid number is determined in accordance with ASTM D1386-59 with the following modifications:
   a. Xylene is substituted for the ethanol toluene mixture as the sample solvent.
   b. A 0.05N sodium hydroxide in methanol solution is substituted for the 0.1N aqueous solution of sodium hydroxide.
   c. The sample size is increased from 1–2 grams to 4.5 to 5.5 grams, and the weighing accuracy is changed from 0.001 to 0.0001 grams.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

About 69.55 weight percent of low-molecular weight modified polyethylene (208.65 g.) having an acid number of 10, a melt viscosity of 18,000 cp. at 150° C., a density of 0.910 g/cc., and ring and ball softening point of 105° C.; about 30 weight percent of highly stabilized ester resin of pentaerythritol and rosin base (90 g.) having an acid number of 12 and a softening point of 103° C. (Foral 105); 0.1 wt. %(.30 g. ) of tetrakis[methylene-3-(3',5'-di-t-butyl-4-hydroxyphenyl)propionate]methane (Irganox 1010); and 0.35 weight percent (1.05 g). dilaurylthiodipropionate (DLTDP) are placed in a 500 ml. round bottom resin pot fitted with a mechanical stirrer and nitrogen purge line. The system is purged with nitrogen and heated to 160° C. using a metal bath. The polymer blend is stirred for one minute after melting to insure that the blend is homogeneous. Bonds made with this adhesive exhibit excellent aged adhesion to corrugated board and Kraft paper and high peel failure temperature performance.

EXAMPLE 2

About 69.55 weight percent low-molecular weight polyethylene (208.65 g.) having a melt viscosity of 18,000 cp. at 150° C., density of 0.91 g./cc., and ring and ball softening point of 104° C.; about 30 weight percent of highly stabilized ester resin of pentaerythritol and rosin base having an acid number of about 12 and a softening point of about 103° C. (90 g.) (Foral 105); 0.1 wt. % (0.30 g.) of tetrakis[methylene-3-(3',5'-di-t-butyl-4-hydroxyphenyl)propiionate[methane; and 0.35 weight percent (1.05 g.) of DLTDP are placed in a 500 ml. round bottom resin pot fitted with a mechanical stirrer and nitrogen purge line. The system is purged with nitrogen and heated to 160° C. using a metal bath. The polymer blend is stirred for one minute after melting to insure that the blend is homogeneous. The molten adhesive has a melt viscosity at 350° F. of 10,000 centipoise. Bonds made with this adhesive exhibit poorer bond aging than the adhesives of Example 1.

EXAMPLE 3

About 50 weight percent of low molecular weight modified polyethylene (150 g.) having an acid number of 10, a melt viscosity of 18,000 centipoises at 150° C., a density of 0.910 g./cc. and a ring and ball softening point of 105° C., about 29.55 weight percent of low molecular weight polyethylene (88.65) having a melt viscosity of 18,000 cp. at 150° C., a density of .916, and a ring and ball softening point of 104° C.; and about 20 weight percent (60 g.) of highly stabilized ester resin of pentaerythritol and rosin base having an acid number of about 12 and a softening point of about 103° C. (Foral 105); about 0.1 weight percent (.30g.) Irganox 1010 and 0.35 weight percent (1.05 g). DLTDP are placed in a 500 ml. round bottom resin pot fitted with a mechanical stirrer and nitrogen purge line. The system is purged with nitrogen and heated to 160° C. using a metal bath. The polymer blend is stirred for one minute after melting to insure that the blend is homogeneous. Bonds made with this adhesive exhibit excellent aged adhesion to corrugated board and Kraft paper and high peel failure temperature performance.

EXAMPLE 4

About 50 weight percent of low molecular weight modified polyethylene (150 g.) having an acid number of 10, a melt viscosity of 18,000 centipoises at 150° C., a density of 0.910 g./cc. and a ring and ball softening point of 105° C., about 29.55 weight percent of low molecular weight polyethylene (88.65 g.) having a melt viscosity of 18,000 cp. at 150° C., a density of .916, and a ring and ball softening point of 104° C.; and about 20 weight percent (60 g.) of highly stabilized ester resin of pentaerythritol and rosin base having an acid number of about 12 and a softening point of about 103° C. (Foral 105); about 0.1 weight percent (.30 g.) Irganox 1010 and 0.35 weight percent (1.05 g.) DLTDP are placed in a 500 ml round bottom resin pot fitted with a mechanical stirrer and nitrogen purge line. The system is purged with nitrogen and heated to 160° C. using a metal bath. The polymer blend is stirred for one minute after melting to insure that the blend is homogeneous. Bonds made with this adhesive exhibit excellent aged adhesion to corrugated board and Kraft paper and high peel failure temperature performance.

The new hot-melt adhesives of this invention give bonds having increased resistance to creep over conventional plastic polyolefin adhesives. These adhesives also give bonds having improved heat resistance and improved cohesive strength. Another advantage is that these adhesives provide hot-melt adhesives useful in plywood lamination-type applications, corrugated carton manufacture and for bonding Kraft paper. Therefore, the hot-melt adhesives may be used to bond a wide variety of substrates, but they are especially useful for wood, paper and other construction type materials.

The invention has been described in considerable detail with particular reference to preferred embodiments thereof, but it will be understood that variations and modifications can be made within the spirit and scope of the invention as described hereinabove and as defined in the claims.

I claim:
1. An adhesive composition capable of being used as a hot melt adhesive wherein said adhesive composition consists essentially of a blend of
    (a) about 90 to 50 percent by weight of at least one modified polyethylene having an acid number of at least 5 prepared by reacting polyethylene with a member selected from the group consisting of unsaturated polycarboxylic acid or anhydride,
    (b) about 10 to 50 percent by weight of at least one rosin ester resin.
2. An adhesive composition according to claim 1 wherein said rosin ester resin is at least one ester of rosin and pentaerythritol.
3. An adhesive composition according to claim 1 wherein said rosin ester resin is at least one ester of rosin and glycerol.
4. An adhesive composition according to claim 1 wherein said rosin ester resin is at least one hydrogenated rosin ester.
5. An adhesive composition according to claim 1 wherein said rosin ester resin is at least one methylated rosin ester.
6. An adhesive composition of claim 1 wherein said modified polyethylene has an acid number of about 10 to about 40.
7. An adhesive composition according to claim 6 wherein said rosin ester resin is at least one ester of rosin and pentaerythritol.
8. An adhesive composition according to claim 6 wherein said rosin ester resin is at least one ester of rosin and glycerol.
9. An adhesive composition according to claim 6 wherein said rosin ester resin is at least one hydrogenated rosin ester.
10. An adhesive composition according to claim 6 wherein said rosin ester resin is at least one methylated rosin ester.
11. An adhesive composition capable of being used as a hot melt adhesive wherein said adhesive composition consists essentially of a blend of
    (a) about 80 to 60 percent by weight of at least one modified polyethylene having an acid number of at least 5 prepared by reacting polyethylene with a member selected from the group consisting of unsaturated polycarboxylic acid or anhydride,
    (b) about 20 to 40 percent by weight of at least one rosin ester resin.
12. An adhesive composition according to claim 11 wherein said rosin ester resin is at least one ester of rosin and pentaerythritol.
13. An adhesive composition according to claim 11 wherein said rosin ester resin is at least one ester of rosin and glycerol.
14. An adhesive composition according to claim 11 wherein said rosin ester resin is at least one hydrogenated rosin ester.
15. An adhesive composition according to claim 11 wherein said rosin ester resin is at least one methylated rosin ester.

16. An adhesive composition of claim 11 wherein said modified polyethylene has an acid number of about 10 to about 40.

17. An adhesive composition according to claim 16 wherein said rosin ester resin is at least one ester of rosin and pentaerythritol.

18. An adhesive composition according to claim 16 wherein said rosin ester resin is at least one ester of rosin and glycerol.

19. An adhesive composition according to claim 16 wherein said rosin ester resin is at least one hydrogenated rosin ester.

20. An adhesive composition according to claim 16 wherein said rosin ester resin is at least one methylated rosin ester.

21. An adhesive composition capable of being used as a hot melt adhesive wherein said adhesive composition consists essentially of a blend of
   (a) about 70 percent by weight of at least one modified polyethylene having an acid number of at least 5 prepared by reacting polyethylene with a member selected from the group consisting of unsaturated polycarboxylic acid or anhydride,
   (b) about 30 percent by weight of at least one rosin ester resin.

22. An adhesive composition according to claim 21 wherein said rosin ester resin is at least one ester of rosin and pentaerythritol.

23. An adhesive composition according to claim 21 wherein said rosin ester resin is at least one ester of rosin and glycerol.

24. An adhesive composition according to claim 21 wherein said rosin ester resin is at least one hydrogenated rosin ester.

25. An adhesive composition according to claim 21 wherein said rosin ester resin is at least one methylated rosin ester.

26. An adhesive composition of claim 21 wherein said modified polyethylene has an acid number of about 10 to about 40.

27. An adhesive composition according to claim 26 wherein said rosin ester resin is at least one ester of rosin and pentaerythritol.

28. An adhesive composition according to claim 26 wherein said rosin ester resin is at least one ester of rosin and glycerol.

29. An adhesive composition according to claim 26 wherein said rosin ester resin is at least one hydrogenated rosin ester.

30. An adhesive composition according to claim 26 wherein said rosin ester resin is at least one methylated rosin ester.

* * * * *